June 23, 1925.
M. KASSER
1,543,574
FILLING AND EMPTYING DEVICE
Filed Dec. 12, 1923 2 Sheets-Sheet 1
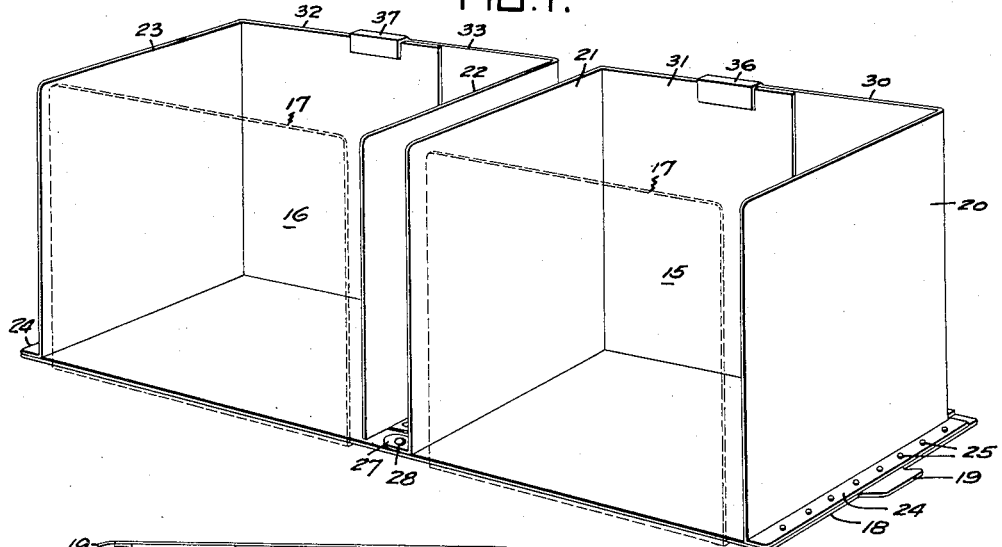
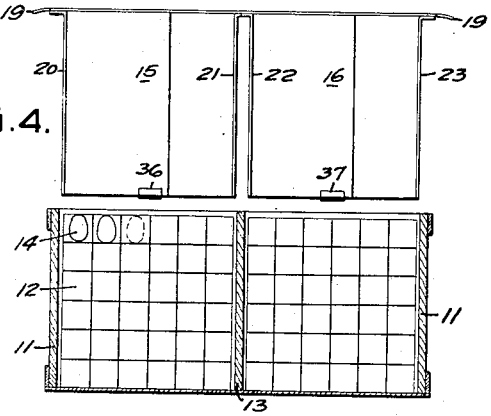
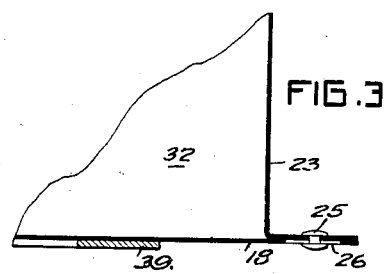
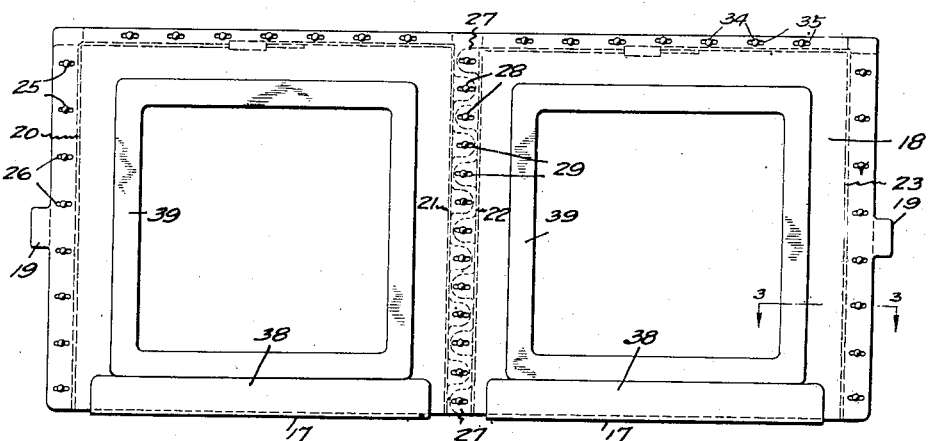
INVENTOR
Morris Kasser
BY
White Prost Evans
his ATTORNEYS.

June 23, 1925. 1,543,574
M. KASSER
FILLING AND EMPTYING DEVICE
Filed Dec. 12, 1923 2 Sheets-Sheet 2
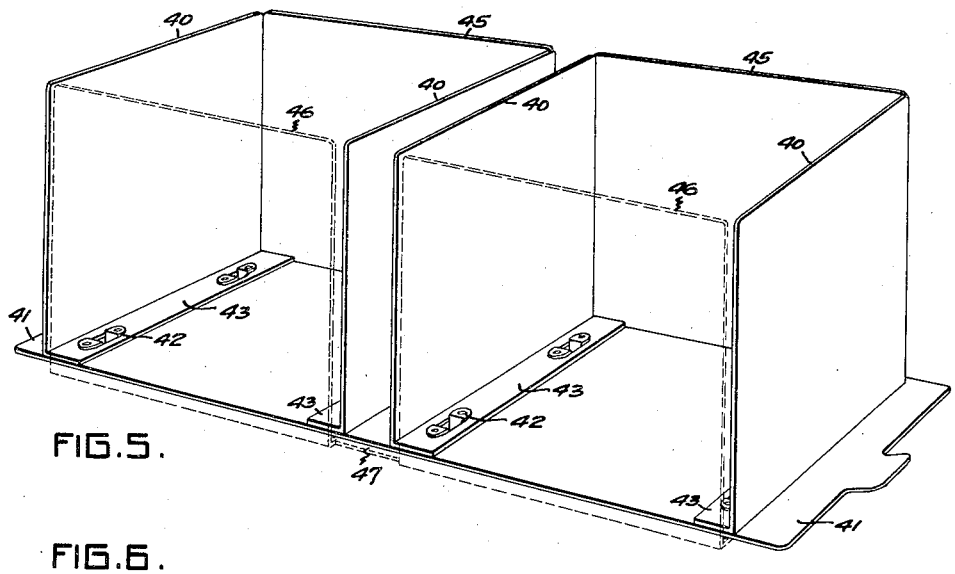
FIG.5.
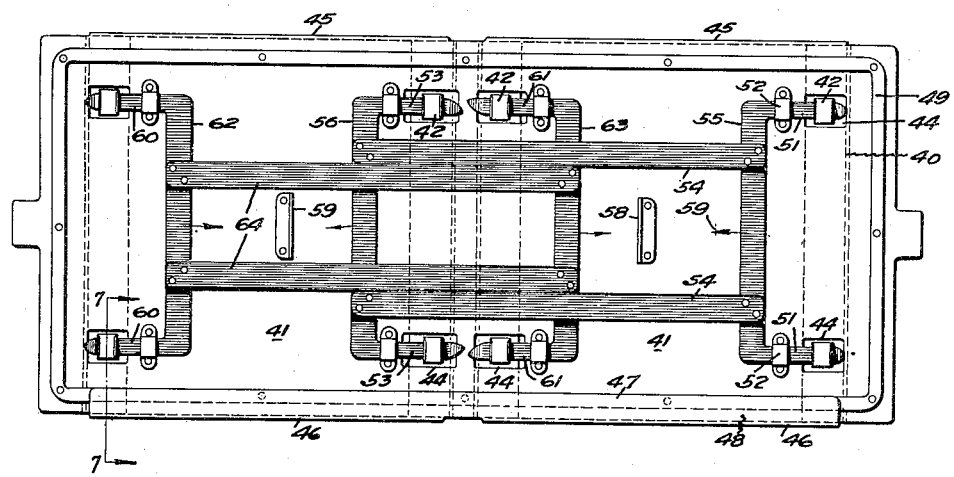
FIG.6.
FIG.8. FIG.7.
INVENTOR
Morris Kasser
BY
White Prost & Evans
his ATTORNEYS.

Patented June 23, 1925.

1,543,574

UNITED STATES PATENT OFFICE.

MORRIS KASSER, OF SAN FRANCISCO, CALIFORNIA.

FILLING AND EMPTYING DEVICE.

Application filed December 12, 1923. Serial No. 680,126.

*To all whom it may concern:*

Be it known that I, MORRIS KASSER, a citizen of the United States, and a resident of the city and county of San Francisco, in the State of California, have invented a new and useful Filling and Emptying Device, of which the following is a specification.

This invention relates to a device for filling or unloading box-like compartments, such as egg-crates.

In many instances, eggs which have been placed in crates are transported for the purpose of bringing them to a place where they are removed, for the purpose of performing an operation thereon, as for washing, candling, grading, transferring, or processing. The removal of the eggs and subsequent repacking are rendered necessary due to the fact that it is often impracticable to perform these operations at the place where the eggs are produced. The most obvious manner of removing and replacing the eggs is that of manipulating one layer at a time, and to facilitate such manipulation, one of the sides of the egg crate must be removed. It is one of the objects of my invention to obviate this long and tedious process.

It is another object of my invention to provide a filling device that is capable of filling and emptying an egg crate with all its layers substantially simultaneously, without material danger of breakage.

I accomplish these results broadly by the aid of a container that telescopes into the crate compartments, and that has walls sufficiently thin to pass readily between the egg fillers and the inner surfaces of the crate sides. In this way, a reversal of the crate and its withdrawal from over the container, leave it standing free of the crate and filled with the eggs. I make at least one of the sides of this telescoping container readily removable, so that the egg layers may be easily and quickly unloaded from this container. It is another object of my invention, in connection with such a telescoping container, to render it capable of being closely fitted into the crate.

Usually each egg crate has two compartments, separated by a central partition, and it is accordingly necessary to use two such telescoping compartments. It very often happens that the sides of the crate as well as this partition are warped or bent or out of alinement. It is another object of my invention to make it possible to unload such a double crate without difficulty even when such conditions exist.

It is still another object of my invention to make it possible to unload a crate by inverting it, without danger of injuring the contents. This I accomplish by preventing friction between the interior walls of the crate and the contents, as by slipping a smooth, flexible element between the crate walls and the contents, before the crate is reversed. This is of great importance for the handling of eggs, for otherwise the egg fillers on reversal would catch along the sides of the crate and injury to the eggs could not be prevented.

It is of course evident that although I have developed the invention for the manipulation of eggs, it is readily adaptable in connection with other packed articles.

My invention possesses other advantageous features, some of which, with the foregoing, will be set forth at length in the following description, where I shall outline in full those forms of the invention which I have selected for illustration in the drawings accompanying and forming part of the present specification. Although I have shown in the drawings but a few embodiments of my invention, it is to be understood that I do not desire to be limited thereto, since the invention as expressed in the claims may be embodied in other forms also.

Referring to the drawings:

Figure 1 is a perspective view of one form of filling device, embodying my invention;

Fig. 2 is a plan view, taken from the bottom, of the device shown in Fig. 1;

Fig. 3 is an enlarged cross section, taken along plane 3—3 of Fig. 2;

Fig. 4 is a cross sectional view of an egg crate and the device illustrated in the previous figures, and showing in a diagrammatic manner, how the device is used;

Fig. 5 is a perspective view of a modified form of my invention, with some of the parts shown removed;

Fig. 6 is a bottom plan view of the device illustrated in Fig. 5;

Fig. 7 is an enlarged sectional view, taken along plane 7—7 of Fig. 6; and

Fig. 8 is a sectional view, taken along plane 8—8 of Fig. 7.

A loaded egg crate 11 is diagrammacally shown in Fig. 4, with the usual cellular fillers 12, and the partition 13, dividing the crate into two compartments. The crate 11 is shown in section. Let it be assumed that it is desired to remove the eggs (shown at 14) from the crate 11, so that they may be candled, processed, or washed. In order to accomplish this result, first a pair of containers 15 and 16 are caused to telescope into the crate compartments. At least one of the sides of each of these containers is removable, such as the front sides 17 (shown in dotted lines in Fig. 1) whereby upon reversal of the crate 11 and removal of it from the telescoped containers 15 and 16, these sides may be removed, and the eggs taken out layer by layer. It is not essential that these containers be provided with bottoms, since as pointed out heretofore, the sides by themselves form a frictionless lining as the crate 11 is being removed.

The layers of eggs are thus immediately accessible for removal, for which purpose any well-known scheme may be utilized. The containers 15 and 16 are purposely made from thin material, such as sheet metal, whereby no difficulty is experienced in sliding the sides of these containers between the eggs in the crate and the inner walls of the crate 11.

One type of construction for these containers is illustrated in detail in Figs. 1, 2 and 3, in which a sheet metal plate 18 serves as the bottom plate for both containers 15 and 16. A pair of ears 19 are provided on this bottom plate to permit of its being readily grasped for withdrawing the telescoped containers from the crate. Each of the containers is formed with sides such as 20, 21, 22 and 23, supported on plate 18. In order to take care of irregularity in the size of the crates 11 and of the compartments therein, I prefer to support these sides in such a way as to permit them to conform to the crate compartments. For this purpose the sides are each provided with the fastening flanges; for example, side 20 has a flange 24 resting on plate 18, and held adjustably thereon by the aid of riveted pins 25. These pins engage in slots 26 in the plate 18, whereby a limited amount of movement of the side 20 is permitted. The side member 23, symmetrical with member 20 is similarly attached. The symmetrically arranged side members 21 and 22, which are adjacent and between which the partition 13 is arranged to enter when the telescoping is performed, have intermeshing feet 27 (shown most clearly in dotted lines in Fig. 2). These feet serve as supports for these sides on the flat plate 18, and are adjustably connected thereto by the aid of the pins 28, and slots 29 in the plate 18.

The back of compartment 15 is formed by over-lapped members 30 and 31 carried by sides 20 and 21 respectively; while the back of compartment 16 is similarly formed by the over-lapping members 32 and 33. These over-lapping parts also have supporting flanges, shown in dotted lines in Fig. 2, through which the pins 34 pass. Slots 35 in plate 18 serve to permit relative movement as with the other members. Clips 36 and 37 prevent the two sections of the back portions from separating laterally. It is also to be noted that all of the slots 26, 29 and 35 are substantially parallel, whereby there can be no difficulty in moving the sides to increase or decrease the size of the containers 15 and 16.

The front sides 17 of the containers 15 and 16, as mentioned heretofore, are readily removable; for this purpose they are formed with the horizontal flanges 38 (Fig. 2) which can slip under the plate 18, but which may readily be removed if desired. These front sides 17 need not necessarily extend entirely across the front of the containers, especially where comparatively large articles are packed in the crate 11. In this way, sufficient leeway is given to the adjustment of the side members 20, 21, 22 and 23. Furthermore a spacer 39 in the form of a frame is fastened to the bottom of each container so as to permit the pins 25, 28, and 34 to clear the surface on which the device rests.

The use of the embodiment just described to unload eggs or other articles from the crate 11 has been touched on heretofore. The containers 15 and 16, exclusive of the front members 17, may first be telescoped into the compartments of the crate 11. Due to the slot and pin connections between the sides and the bottoms of the containers, it is a comparatively simple matter to adjust these sides to the compartments. Afterwards, front members 17 may be slipped into place. This condition for the filling device is shown in Fig. 2. The entire crate 11 may now be turned over, rested on spacers 39, and lifted off clear of the telescoped containers. The eggs 14 and the cellular trays 12 remain in the containers 15 and 16; they are not disturbed materially, since the edges of these trays can slip without material friction on the sides of the containers 15 and 16. By removing the fronts 17, these layers of eggs are immediately available for transportation on spades or the like to the place where they are to be treated.

After treatment, the eggs are placed layer by layer back into the containers 15 and 16, or into similar ones. As soon as these containers are filled, the front sides 17 are placed in position as in Fig. 1. Then an egg crate is telescoped over the containers 15 and 16, after which operation these containers and the crate are again reversed. The containers 15 and 16 can now be removed, leaving the eggs in the crate 11.

Where many crates must be unloaded and loaded, a considerable saving in time is secured by this procedure. Only the top covers of the crates need be removed, which operation is a comparatively simple one. Several devices of the sort shown in Fig. 1 may be provided, and are sufficient to take care of a great many unloadings and loadings.

The device shown in Fig. 1, while entirely practicable, may sometimes be somewhat difficult to manipulate, since both containers 15 and 16 are supported on a common base, such as plate 18. For example, it sometimes happens that the partition 13 is not perfectly vertical, or is not placed exactly at right angles to the long sides of the crate 11. To insert both of the containers 15 and 16 into telescoping relations under such conditions is not very easy. To overcome these and other difficulties, I prefer to utilize the form of my invention illustrated in Figs. 5, 6, 7 and 8.

In that embodiment, the side members 40 are readily detachable from the base 41, and may each be separately inserted into the crate 11 near the corresponding wall. To hold these sides 40 detachably to the plate 41, clips 42 are provided, fastened to the horizontal flanges 43 of the sides 40. These clips (shown two to each flange 43) extend through rectangular openings 44 in the base plate 41, and form eyes for a purpose to be hereinafter described. The back plates 45 may be permanently attached to the base 41. The front plates 46 are not secured in any manner to the base 41, but have a common horizontal flange 47 from which the plates extend, reinforced by the small angle iron 48, shown most clearly in Fig. 7.

The mode of procedure for unloading with this form of my invention is to insert first of all the side members 40, and then to place the base 41 into position, the backs 45 slipping into place. It is to be noted that the apertures 44 provide a substantial clearance for the clips 42, so that the positions of these clips may be varied to a considerable extent in response to the proper adjustment of the sides with which they are associated. After the base 41 is in place, various locking bars may be inserted in the eyes formed by the clips 42, to hold this base to the sides 40 in a detachable manner. Then the front members 46 may be slipped into place, whereupon the entire crate may be reversed and supported on the spacing bead 49 which forms a frame near the edge of the base 41. This bead in the present instance is formed of an angle iron, the horizontal flange of which is spaced from the bottom of base 41 by the aid of a number of cylindrical posts 50. After reversal, the crate 11 may be removed. The manner of using the reverse process of filling the crate is evident, and requires no further explanation.

Due to the fact that the sides 40 are entirely separable from the base 41, they may be independently inserted or removed from the crate 11; no difficulty at all is encountered in the proper telescoping of the various parts of the filling device, although the crate may be warped or otherwise irregular in form. This effect is assisted by the use of highly flexible sheet metal, which metal permits the elements to conform readily to any of the irregular portions of the crate.

Although individual locking bars for the clips 42 may be provided, yet for the sake of expediency in locking and unlocking the base 41 and sides 40, I prefer to utilize some combined form of bars as is illustrated most clearly in Fig. 6. In this figure, locking extensions 51 cooperate with the extreme right hand clips 42, the locking movement being toward the right, and guided by clips 52 fastened to the bottom of plate 41. A right hand locking movement is also provided for the locking extensions 53, cooperating with the clips 42 at the right hand side of the left hand crate compartment. I prefer therefore to provide a common operating device for the bars 51 and 53, associated with the alternate parallel sides 40, and this I accomplish by the aid of the bars 54 connecting the two yokes 55 and 56 on which the locking extensions are carried. Enough leeway for taking care of irregularities is provided by the fact that the bars 54 are long and made from resilient metal, and that the ends of the locking extensions 51 and 53 are bevelled off on all four sides whereby they may readily enter the clips 42. Furthermore, these clips have upturned lips 57 (shown most clearly in Fig. 8) whereby the entry of the extensions is further facilitated. Manipulation of the bars 51 and 53 is also rendered easier by the aid of the abutment 58, which is located between the two bars 54. By grasping this abutment and yoke 55 by the fingers of one hand, the yoke 55 may be moved in the direction of arrow 59 to unlock the sides 40. With the other hand, a similar abutment 59 may be grasped, as well as bar 56, to assist this opening movement.

The locking extensions 60 and 61 for the left hand side members 40 of both compartments, are shown as operated in a similar manner to that just dscribed. They are carried by yokes 62 and 63, which are connected by the comparatively long rods 64. These rods are located between the other rods 54, whereby they do not interfere in the free movement of any of them. The manner of operating the extensions 60 and 61 is also substantially similar to that already described. Use of the abutments 59 may also be made to assist in opening the locks.

The advantages of this second preferred form of my invention are evident from the foregoing description. The device is especially adapted for use with machines for processing, candling or washing eggs, since by removing the fronts of the devices, it is possible to take out the eggs layer by layer, and deposit them in appropriate carriers passing through the machine. However, substantially the same inventive idea is capable of utilization for removing and replacing other kinds of articles, such as fruit, on which a process is to be performed. Furthermore, if desired, the bases 18 or 41 may under certain circumstances become unnecessary, and the containers may be used without them.

I claim:

1. In a device of the character described, a container adapted to fit telescopically closely within a space, said container having sides adjustable to fit into non-rectangular spaces, and at least a portion of the walls being removable.

2. In a device for removing and replacing articles from an enclosure, a container adapted to fit telescopically closely within the enclosure, and means for angularly adjusting and attaching the sides of the container, whereby said container may be readily telescoped into enclosures having walls deviating substantially from rectangular relation; said container, on reversal of the telescoped enclosure and container, and subsequent separation, acting to transfer articles from one of the two spaces defined by the container and by the enclosure, to the other.

3. In a device for removing and replacing articles from an enclosure, a container adapted to fit telescopically closely within the enclosure, at least a portion of the walls of said container being removable, and means whereby the sides of the container are rendered adjustable, so that it may be readily telescoped into variable-sized, non-rectangular enclosures, said container, on reversal of the telescoped enclosure and container, and subsequent separation, acting to transfer articles from one of the two spaces defined by the enclosure and by the container, to the other.

4. In a device of the character described, a pair of containers having a common base, said containers being adapted to telescope into an enclosure, and means for angularly adjusting some of the sides of the containers on the base, whereby the containers may readily be adjusted to fit into enclosures having walls deviating substantially from rectangular relation.

5. In a device for removing and replacing articles from an enclosure, a container of flexible, thin material, adapted to fit telescopically closely within the enclosure, said container having a base to which at least some of the walls of the container are adjustably fastened so as to permit relative angular adjustment of the walls, and at least a portion of the walls being removable, said container, on reversal of the telescoped enclosure and container, and subsequent separation, acting to transfer articles from one of the two spaces defined by the enclosure and by the container, to the other.

6. In a device for removing and replacing articles from an enclosure having a pair of compartments, a pair of containers having a common base, said containers being formed of flexible, thin material, adapted to fit telescopically closely within the compartments, means whereby some of the walls of each container are adjustably fastened to the base so as to permit relative angular adjustment of the walls, and at least a portion of the walls being removable, said containers, on reversal of the telescoped enclosure and containers, and subsequent separation, acting to transfer articles from one of the two spaces defined by the compartments and by the containers, to the other.

7. In a device for removing and replacing articles from an enclosure, a base, sides on the base having eyes projecting through the base, and locking bars for passing through the eyes, whereby the sides are detachably held to the base, said sides being adapted to telescope into the enclosure.

8. In a device for removing and replacing articles from an enclosure, a base, sides of thin, flexible material on the base, having eyes projecting through the base, and means engaging the eyes for detachably fastening the sides to the base, said sides being adapted to telescope into the enclosure.

9. In a device for removing and replacing articles from an enclosure having a pair of compartments, a base, sides supported on said base and forming a pair of open sided containers that are adapted to telescope into the compartments, and means whereby at least some of the sides of each container are detachably secured to the base, comprising eyes carried by these sides and projecting through the base, and locking bars for said eyes.

10. In a device for removing and replacing articles from an enclosure having a pair of compartments, a base, sides forming a pair of open sided containers adapted to telescope closely within the compartments, and means for detachably fastening some of the sides to the base, comprising eyes formed on the sides and projecting through the base, there being four series of eyes, arranged substantially parallel, corresponding to the four parallel walls of the two adjacent containers, locking bars for the eyes, and common operating means for alternate series of locking bars.

11. In a device for removing and replacing articles from an enclosure having a pair of compartments, a base, sides forming a pair of open sided, parallel containers adapted to telescope closely within the compartments, and means for detachably securing those four sides of the containers on the base, which form a series of parallel walls, comprising flanges on said sides, eyes formed on said flanges and projecting through apertures in said base, locking bars for said eyes, the bars for alternate parallel sides being movable in the same direction for operating them, and common connections for those locking bars which are associated with the alternate parallel sides.

12. The method of transferring articles from a four sided container having substantially flat walls that deviate substantially from rectangular relation, which comprises inserting flexible sheets individually between each of the walls and the articles in the container, so that they extend substantially to the bottom of the container, covering the top of the container, reversing the container, and removing the container.

13. The method of transferring articles from a container having a base, and a plurality of walls substantially perpendicular to the base, which comprises inserting sheets individually between each of the walls and the articles in the container so that they extend substantially to the bottom of the container, covering the top of the container, reversing the container, and removing the container.

14. The method of loading articles into a container having a base, and a plurality of walls substantially perpendicular to the base, which consists in telescoping the container over the articles surrounded by thin sheets which form the walls of a space similar to that defined by the container, reversing the container, and removing the thin sheets individually from between the walls of the container and the articles.

In testimony whereof, I have hereunto set my hand.

MORRIS KASSER.